March 18, 1947. D. F. GEIGER ET AL 2,417,483
VALVED PIPE COUPLING
Filed April 28, 1944 2 Sheets-Sheet 1
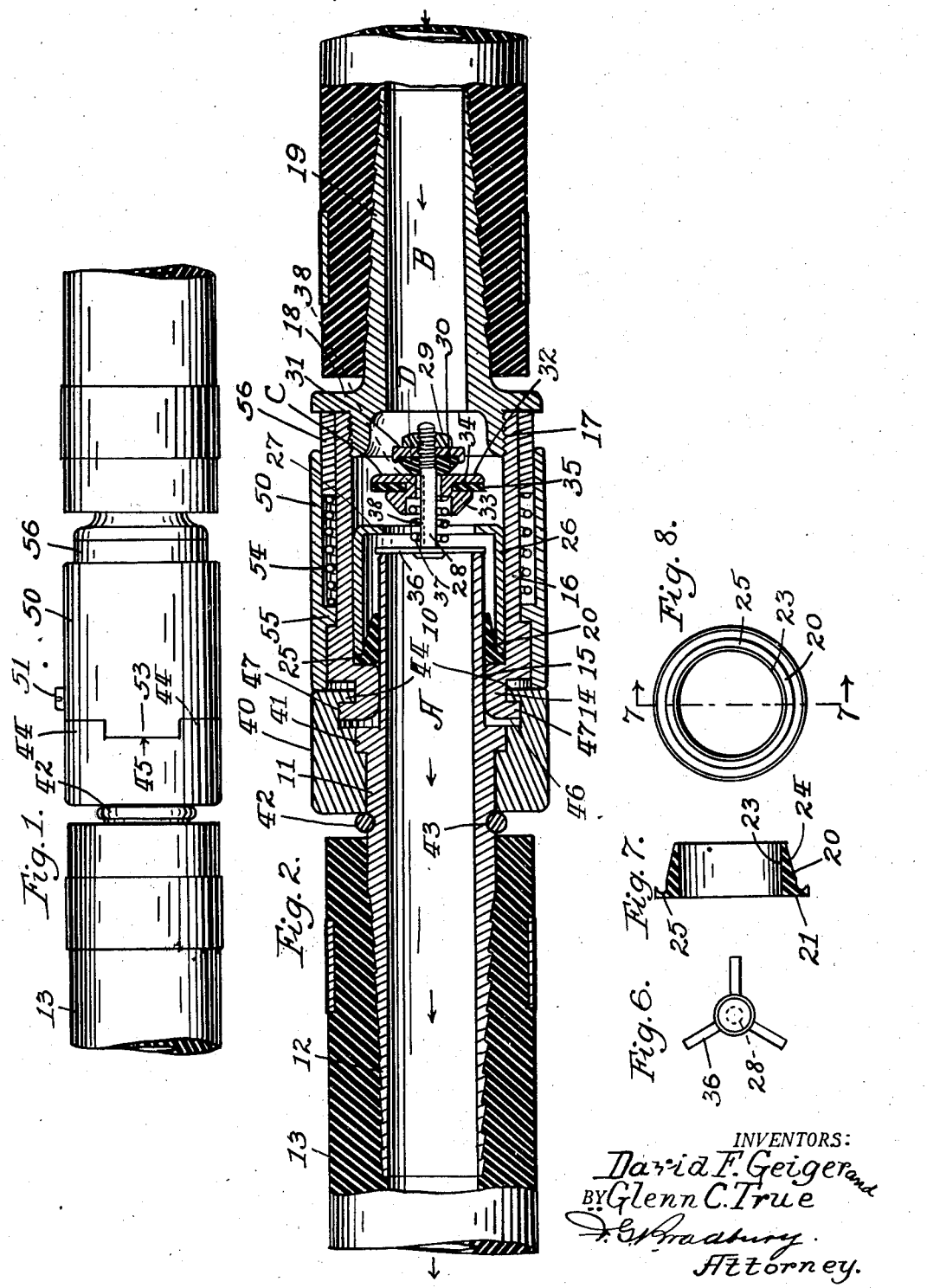
INVENTORS:
David F. Geiger and
By Glenn C. True
Attorney.

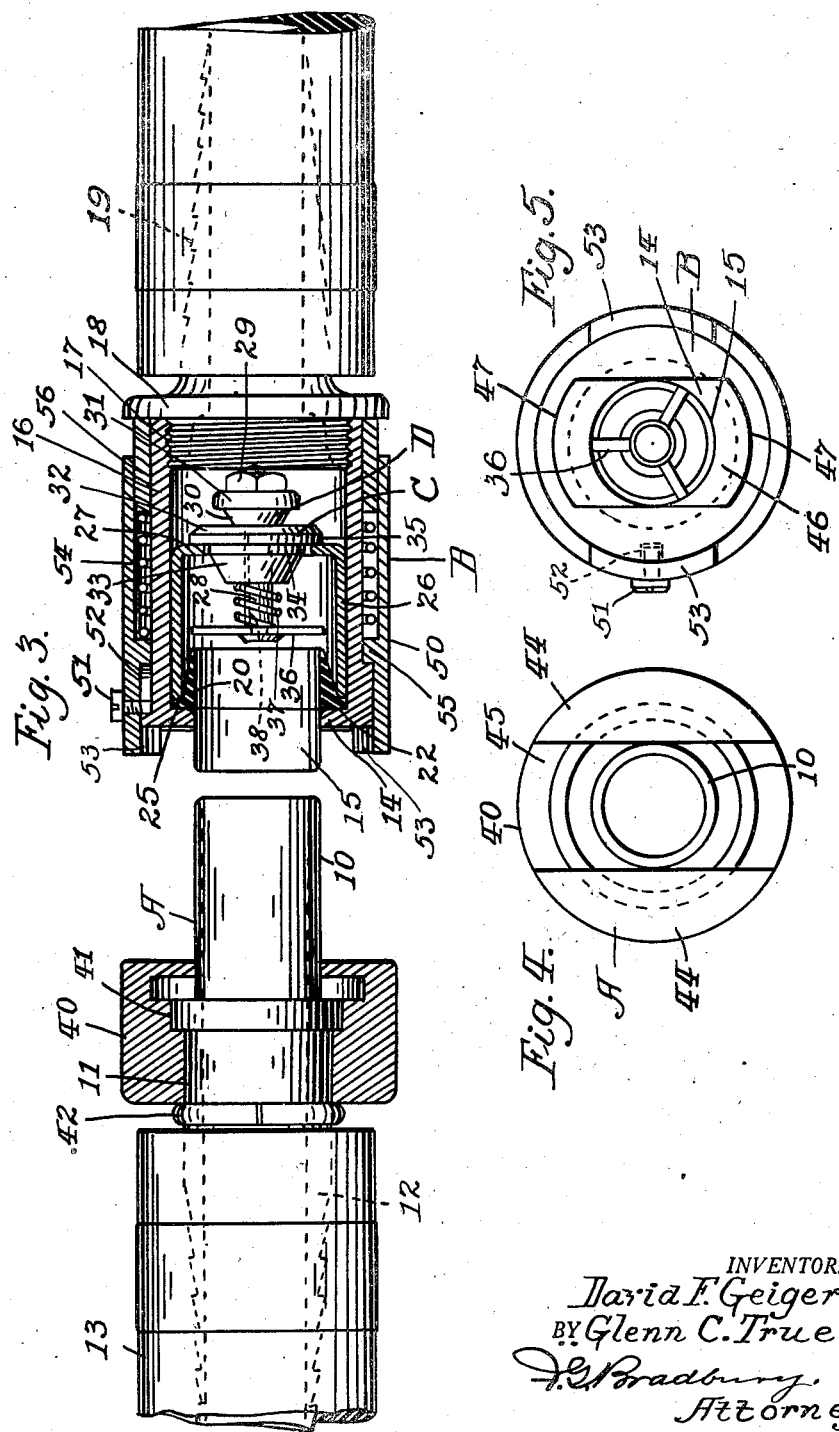

Patented Mar. 18, 1947

2,417,483

UNITED STATES PATENT OFFICE 2,417,483

VALVED PIPE COUPLING

David F. Geiger and Glenn C. True,
Long Beach, Calif.

Application April 28, 1944, Serial No. 533,212

1 Claim. (Cl. 284—19)

Our invention relates to improvements in couplings of that type having a quick acting interlocking connection. An object of the invention is to provide means for easily and quickly connecting the members of a pair of fluid transmitting ducts against high pressure so that fluid under high pressure can be transmitted and so that disconnection can be easily and quickly made, without material loss or leakage of the fluid when making or breaking a connection. Another object is to provide means for equalizing pressure between the sections of the ducts which are connected so that a check valve will open completely when a connection is made without retarding the flow of fluid through the ducts. Among other objects are to reduce the length of the coupling to a minimum, to avoid jamming of the coupling members when making a connection, to assure the proper seating of a check valve in one of the coupling elements when the coupling elements are disconnected, to provide simple and inexpensive construction, and to permit a type of construction which facilitates ease and effectiveness in connecting or disconnecting the members of the coupling. Other objects of the invention will be apparent from the following description.

Our improvement thus provides a master check valve which closes automatically when two sections of a hose or other duct are disconnected. During the act of reassembling a small by-pass valve is first made to positively open automatically, thus tending to equalize the pressure on opposite sides of the master valve, whereby the master valve of larger area is caused to open more freely and in a more efficient manner than otherwise to complete an unobstructed connection without loss or reduction of fluid pressure.

In the accompanying drawings forming part of this specification, Fig. 1 is a side elevation of our improved coupling showing portions of two sections of a hose connected thereby; Fig. 2 is a longitudinal central section on an enlarged scale of our improved structure; Fig. 3 is a central longitudinal section, like in Fig. 2, showing portions of the two sections of our improved coupling when disconnected; Fig. 4 is an end elevation of the male member of our improved coupling; Fig. 5 is an end elevation of the female member of the coupling; Fig. 6 is an end elevation looking at the spider element on the check valve structure employed in the female member of the coupling; Fig. 7 is a section taken on the line 7—7 of Fig. 8, and Fig. 8 is an end view of the resilient packing element shown in Fig. 7.

In the drawings A indicates the male member and B the female member of our improved coupling. The male member has a cylindrical coupling nozzle 10 projecting forwardly as a continuation of the cylindrical tubular seat 11, said seat in turn as shown being integral with a rearwardly extending tubular hose connection 12 or other suitable means of connection with a duct with which it may be desired to make connection. As shown a section of hose 13 to be connected by the coupling is shown attached to the hose connection 12 in the usual manner.

The female member of the coupling has an annular socket member 14 which is provided with an annular bore 15 corresponding with the nozzle to receive the latter forwardly into connection with the female member of the union. The socket member 14 has a forwardly extending hollow cylindrical body 16, the inner forward end of which is internally threaded at 17 to receive the threaded body 18 of the hose connection 19, or other means of connection with a duct by which it may be desired to make connection with a source of fluid under pressure.

A fluid tight connection is made by a resilient packing annulus 20, which is freely replaceable in the body 16. The flat end 21 of the annulus is seated against an annular abutment 22 in the socket member 14. The bore 23 of the annulus corresponds with the outer side surface of the nozzle 10 to slidably receive or permit free removal of the latter into or from the female member of the coupling. The outer portion of the packing annulus has an outer forward tapering end 24 and an annular seat 25. A thin cylindrical inner sleeve 26 is firmly engaged in the cylindrical body 16 with its rearward end placed firmly in the seat 25 so as to compress the packing annulus and cause even flow of the resilient packing material. In this manner a leak proof joint is produced between the male and female members of the coupling. The forward end of the inner sleeve 26 is struck inwardly to form an annular end 27 upon which the master valve C, of a check valve structure, seats automatically when the members A and B of the coupling are disconnected.

The check valve structure comprises two valve members, one the master valve C, and the other the by-pass or auxiliary valve D. These valve elements are mounted upon a longitudinal stem 28, the by-pass valve being secured rigidly by the threadedly engaged nut 29, which holds the conical resilient valve head 30 on the forward end of the stem and seated rearwardly against the cup 31. The master valve has a body which slides freely on the valve stem to the rear of the by-pass valve and is formed with a head 32 and a rearwardly tapering end 33 between which parts is an annular channel 34. A resilient valve, resembling a washer 35 is seated in said channel and is held by the head 32 with its rearward face exposed and of sufficient diameter to seat firmly against the annular seat 27. Thus when acting under the force of compressed fluid in the female member of the coupling the main valve is adapted to close and check the egress of compressed fluid from within. The valve structure is retained freely with its stem extending loosely through the opening within the valve seat 27 by the spider 36 (see Fig. 6), which is held rigidly on the rearward end of the stem 28 and lodges against the forward end of the nozzle 10 when the male and female members of the coupling are connected. A helical expansion spring 37, threaded freely over the stem 28 normally holds the master valve open against the by-pass valve when a connection between the male and female members of the coupling is completed but permits the master valve to close as soon as said parts are disengaged. A longitudinal channel 38 in the valve stem 28 in addition to the loose sliding fit of the stem 28 in the master valve allows a portion of the compressed fluid to first by-pass while a connection of the male and female members of the coupling is being made by inserting the nozzle forwardly through the bore of the socket member 14 until the pressure on both sides of the valve structure is balanced. Immediately as the pressure becomes equalized the master valve is forced open by the expansion spring 37. The feature of opening the by-pass first in a positive manner assures the proper functioning of the master check valve into open position and at the same time permits the quick and positive closing of the valves when the coupling elements are disconnected. This compels the parts of the device to function easily under high or medium fluid pressure. Without the by-pass valve a connection cannot be made, under high pressure of fluid except by extreme effort on the part of the operator. By the use of the by-pass valve the effort required to make a connection is materially reduced.

The male and female coupling elements are adapted to be secured tightly together by improved interlocking means which requires assembling of the coupling elements by a combined lateral and lengthwise movement of interlocking parts. To this end the male member A is provided with a hollow cylindrical head 40 which is freely swiveled between and held longitudinally by a pair of annular shoulders 41 and 42 or other suitable means on the tubular seat 11. Shoulder 42 is formed by a split end ring which locks in an annular groove 43 in the tubular seat 11. The forward end of the head 40 is provided with a pair of longitudinal and transversely parallel holding key shoulders 44, between which is a transverse key receiving slot 45 (see Figs. 1 and 4). In this position the nozzle 10 projects forwardly through said slot and beyond said shoulders.

The socket member of the female coupling element is provided with a transverse key head which projects rearwardly from the socket member 14 and is formed by a pair of radiating shoulders 47. The width of the key head corresponds substantially with the width of slot 45 so that the key head may be inserted longitudinally into the slot 45 until its shoulders are in a plane back of the corresponding shoulders 44 on the coupling head 40 of the male coupling member. When thus inserted and either said head of the female coupling member or the male coupling element is revolved 45 degrees, the shoulders of the two members 14 and 40 are adapted to engage and thus secure the coupling members closely united.

By constructing the key shoulders 44 on the head 40 of the male coupling member parallel and transversely across the head and by constructing the coupling head of the female member with corresponding flat sides to seat in the slot 45, a joint is produced which is simple and inexpensive to construct and which is stronger than previous joints.

The cylindrical body 16 of the female coupling member is provided with locking means by which the two interlocking members of the male and female coupling elements are held in engagement, or are released to permit separation. This locking means comprises a relatively thin sleeve 50 which is free to reciprocate, to a limited extent, longitudinally on said body. This sleeve is prevented from turning and is limited in longitudinal sliding movement by the threaded screw or key 51, which engages through the sleeve and in the longitudinal slot or keyway 52 (see Fig. 3), in the rearward outer position of the tubular body 16. The sleeve 50 has a pair of diametrally opposite tongues 53 (see Figs. 1, 3 and 5), which project rearwardly. These tongues correspond with and engage in the transverse slot 45 and between the pair of shoulders 44 on the swiveled head 40 of the male coupling member (see Fig. 4), when the shoulder elements 44 are engaged by the radiating shoulders 47 as shown in Fig. 1. The sleeve 50 is retained in interlocking position by a helical expansion spring 54 which is freely threaded over the cylindrical body 16 and is compressed between an annular shoulder 55 on the inner surface of sleeve 50 and a spacing ring 56 which is placed over the body 16 and against the threaded body 18 of the hose connector 19. Thus the male and female members of the coupling can be easily and quickly assembled or disassembled. When assembled the coupling elements are free to swivel without breaking the fluid connection, thus enabling kinks in the hose to be easily released and the hose sections freed from twists.

The packing annulus 20 seals the male and female coupling elements when the latter are assembled. When disassembled both the master and by-pass valves are closed upon their seats automatically by the force of compressed fluid admitted through the hose connection 19. In the act of closing the tapering end 33 of the master valve serves to assist in centralizing said valve upon its seat. As the coupling elements are reassembled the by-pass valve is first positively opened by the insertion of the nozzle 10 against the spider 36, whereby fluid pressure is allowed to equalize in both sections of the coupling elements, followed by the free opening of the master valve C automatically by the force of the expansion spring 37. In this manner a clear passage for compressed fluid is provided through the coupling. The device is thus made positive to always open or close the connection when fluid under high or medium pressure is transmitted by the hose connections.

In accordance with the patent statutes we have described the principles of operation of our improvement together with the construction thereof which we now consider to represent the best embodiment thereof, but we desire to have it understood that the structure shown is only illustrative and that the invention can be carried out by other means and applied to uses other than those above set forth within the spirit of the invention and within the scope of the following claim.

We claim:

A coupling, comprising two coaxial male and female coupling members designed for end to end coaxial connection, the male member having a longitudinal nozzle and the female member a longitudinal hollow cylindrical body formed with an annular shoulder and bore therein to receive said nozzle, a sleeve held in said body and having an inner annular valve seat on its rearward end, a packing annulus held between the forward annular end of said sleeve and said annular shoulder and embracing said nozzle, a master check valve normally closing said valve seat and having a by-passage therethrough entering the female coupling member, a valve stem on which said master valve is freely reciprocable, an auxiliary valve fixed upon the rearward end of said valve stem and normally closing said by-passage, an actuating element on the forward end of said valve stem in the path of the outer end of said nozzle to open the auxiliary valve ahead of the master check valve when said actuating element is depressed by the nozzle, and an expansion spring interposed between said actuating element and said master valve whereby fluid pressure is adapted to be equalized on opposite sides of the master check valve to permit the latter opening freely.

DAVID F. GEIGER.
GLENN C. TRUE.

REFERENCES CITED

The following references are of record in the file of this patent:

UNITED STATES PATENTS

| Number | Name | Date |
| --- | --- | --- |
| 699,366 | Bowes, Jr. | May 6, 1902 |
| 809,746 | Rhoads | Jan. 9, 1906 |
| 2,181,758 | Goon et al. | Nov. 28, 1939 |
| 2,265,267 | Cowles | Dec. 9, 1941 |
| 2,288,565 | Green | June 30, 1942 |
| 1,343,819 | Grenci | June 15, 1920 |
| 2,050,647 | Carter | Aug. 11, 1936 |
| 2,370,182 | Morrow et al. | Feb. 27, 1945 |
| 2,177,740 | Orndorff et al. | Oct. 31, 1939 |